Patented Nov. 19, 1946

2,411,201

UNITED STATES PATENT OFFICE 2,411,201

PROCESS FOR IMPROVING FATS AND OILS BY ADDITION OF OLIVE AND COCONUT COLOR, ODOR AND FLAVOR DERIVED FROM OLIVE AND COCONUT JUICES AND THE RESULTANT PRODUCT

John Hood Forkner, Fresno, Calif.

No Drawing. Application June 17, 1946, Serial No. 677,410

30 Claims. (Cl. 99—118)

This invention relates primarily to the treatment of fatty materials, such as refined edible oils and fats by infusion with a by-product, namely, presently discarded juice of certain products of plant origin, such as oil seeds or nuts to impart a desired flavor, color and aroma to the refined oil.

More specifically, the invention relates to a novel method of altering or changing the characteristics of odor, flavor or color of fatty materials by treating the same with the normally discarded juice of oil-and-juice-bearing vegetable substances, such as, for example, olives and coconuts, and to the product resulting therefrom.

An object of the invention is to provide a new and improved method of imparting a coconut flavor or aroma to refined edible oils.

Another object is to provide a new and improved method of imparting an olive flavor, color or odor to a refined oil.

Another object of the invention is to produce a new and improved olive-like or coconut-like oil or fat wherein the oil or fat is of an origin other than that of olive or coconut, but wherein the oil or fat has imparted to it one or more of the characteristics of odor, taste and color of natural olive or coconut oil.

Again, when necessary to remove the free fatty acids, foots or undesirable fractions from olive or coconut oil by processing and refining, it is an object to provide a new and improved method of recreating in the oil a flavor, odor and color simulating, respectively, the natural olive or coconut flavor, color and odor.

Another object is to provide a new and improved method of imparting an olive or coconut flavor to solvent extracted oils by first refining said oil and subsequently adding only the olive or coconut taste, odor or color.

I am particularly desirous of improving the flavor and odor of American olive oils by imparting to them the superior or desired flavor of the Mediterranean olive.

A further object of my invention is to provide a new and improved method for imparting to refined fish oils olive oil characteristics.

It, therefore, is an object of the invention to produce an edible oil no part of which is olive oil yet having all the desirable characteristics of olive oil.

Numbered, also, among the objects is a process adapted to improve materially the flavor, odor or color of an olive oil without adding it to another olive oil.

A still further object is the production of an improved natural flavored, colored and odorized soap possessing desirable qualities present naturally in olive or coconut oils.

Although the objects make only specific reference to olive and coconut oils, it is contemplated that certain other oils and extracts are equally effective when subjected to the same new and improved procedure.

It is recognized that ground olive products have for centuries been commonly used as flavors. In recent years, since the refining of oils has been developed, it has been natural to flavor these oils with pastes made of fresh, salted or dehydrated olives. However, beyond the fact that my new and improved process described herein is economical and effective, it differs from prior knowledge or practice in that it can create olive characteristics in oils without making any part of the oil an olive oil.

Again, the olive characteristics of poor olive oils can be increased without being forced to blend with higher grade olive oils including those oils contained in olives or olive paste.

Yet again, the flavor of commercial olive oils may be vastly enhanced or standardized beyond possibilities of the prior art which depends upon mixing in whole or concentrated olive pastes.

Fundamentally, the best olive oil commands the highest price, and the superior quality of the oil depends principally upon color, odor and taste. Commercially, Mediterranean olive oil is more universally desired because of its characteristic qualities of color, odor or taste, or a combination of those qualities, and therefore commands a higher price. If these qualities present in Mediterranean olive oils can be imparted to American olive oils, the desirability, universal appeal and value will be greatly enhanced. The high yield per acre of American growing technique could then enjoy the added value of highly acceptable color, odor and flavor which heretofore has been to some extent lacking.

The distinctions of many olive oils is readily traceable to the manner of growing the olives and in the variety of olives. Olives from unirrigated districts frequently are superior with respect to odor, color and taste to olives from irrigated districts.

Many oils other than olive oil, of course, are equally capable of the uses to which olive oil is put, but they are not always acceptable purely by reason of their lacking some combination of the color, odor and flavor of olive oil. If those other oils could be given the highly desired olive oil characteristics, their acceptability would be enhanced immeasurably.

Obviously, the prior art method, which teaches the use of fresh or salted or dehydrated olives as a flavoring, is a method of imparting enhanced flavor by incorporating a substantial olive oil content in the product to be flavored. For example, the oil soluble portion of fresh olive paste is about 16% to 23%, of salted olives as much as 35% and of dehydrated olive paste as much as 50%. To this extent and to the amount used there may be added olive oil to the oil with which they are mixed. I have found that by transferring the flavor through the olive juice I can impart the olive characteristics without necessarily incorporating any olive oil. Also, I transmit essentially the natural flavor and color of the original olive. The weight added to the treated oil by the natural flavor and color agents present in the juice is undetectable in commercial quantities.

Contrastingly, a ton of fresh olive paste added to a ton of cotton seed refined oil and the mass filtered and oil separated would yield a combined oil approximating 2,000 pounds of cotton seed oil and 300 pounds of olive oil. Beyond this obvious and frequently unpractical high cost of imparting flavor it is often undesirable to have oil which is neither cotton seed nor olive but a mixture of both.

I can produce a similar flavored and colored oil and, if desired, a much richer olive-charactered oil, without adding any olive oil to the cotton seed oil and at a fraction of the usual cost, with the added advantage of using an olive agent (olive juice) now discarded by the industry.

Likewise, instead of improving the characteristics of olive oil by mixing it with other olive oil, either before or after removal from the olive, I can effectively and economically fortify certain olive oils with olive characteristics by transmission of improved characteristics through the juices from select olives.

To achieve partially the desired results heretofore olive processors have ground good olives to create a flavoring agent. They have mixed high grade olive pastes and oils with less valuable oils. Through my process olive oil processors may grade up and standardize their olive oils with olive juice now universally discarded.

In addition, they will impart olive characteristics to other oils by utilization of this waste juice. My objective is to use this valuable, now wasted juice to utilize more completely the olive.

Other objects will appear obvious in the use of oils thus treated, particularly in the manufacture of mayonnaise, salad oil and dressing, hydrogenated fats and butter and oleo-margarine. For the most part in this description examples of either olive or coconut are illustrated individually, but it is understood that the same technique applies to either olives or coconuts.

The oils to which this process refer are virgin olive oil and refined glyceride oils, particularly refined olive, coconut, cotton seed, soya bean, corn, peanut, sunflower, grape and lard oils, and also butter fats and milk solids, olein and fish oils, by way of example, which have been treated to one or more of the processes of causticizing, bleaching, winterizing, deodorizing or hydrogenating. The process is sometimes applicable to soap fats and oils after their saponification. The term "fatty material" as used herein is to be understood as including at least the aforementioned oils and fats.

The term "characteristic" when used herein has special reference to odor, color or flavor and not to other qualities of the oil.

By "juice" is meant the watery liquid resulting after the crushing, grinding or macerating and the pressing and separating of most of the oil from the olive or coconut. When reference is made to "olive seed" the whole olive is ordinarily meant, both flesh and pit. The juice used may be from the olive seed, namely, the entire ground whole olive, or the juice resulting from pressing of the fresh olives after removal of the pits. The fresh olive juice herein referred to is essentially juice from olives which have a major part of their original moisture remaining in them. The juice is substantially free of oil, or in other words, the juice may be said to be a water solution or mixture of substances other than free oil. Coconuts are usually classed as nuts and constitute both flesh and juice within a hard-shelled exterior.

The coconut milk from the center of the coconut is good, but I find that the juice pressed from coconut flesh is most desirable. I can use fresh, pasteurized or otherwise properly preserved or condensed coconut or olive juice. Essentially, pure fresh juice is preferred, but my process is workable with certain adulterated juices or partial concentrates.

By Mediterranean olive juice I naturally mean juice from olives grown in the Mediterranean area, but the process results are of special merit when utilizing juice obtained from olives from select groves and harvestings of Italy, Spain and Greece.

The essence of my invention is to intimately mix refined oils and fats with coconut or olive juice and then separate the two ingredients and by this process creating or enhancing the coconut or olive flavor, odor and color in the oil so treated.

Ordinarily, in the manufacture of olive oil, olives are first crushed whole in a suitable grinder or stone mill. The mass is placed in a hydraulic press in press cloths and pressed to as much as 2,000 pounds pressure per square inch. Both the juice and oil are expelled into a tank, and after proper allowance of time for settling the oils are decanted off the surface, leaving the essentially pure fresh juice in the settling tank. It is this juice that I prefer to use in the process herein described. Virtually all of the juice in the olive pressing industry and essentially all of the juice in the coconut processing industry are presently unused and discarded.

The most valuable juices of my process come from high quality olives which produce the best quality oils, and, naturally, the least valuable juices come from oils of poor quality olives. Quality can vary between regions, climatic conditions at a given season, types of olives, disease, and farming variations. As an example, the color variation found in olives between early and late crop varieties is apparent from a color analysis of their oils. The University of California's report entitled "A discussion of some of the physical and chemical constants of olive oil from olives at different stages of maturity, of different varieties, and from different localities," by Nichols and Friar (published in the Fruit Products Journal, New York, N. Y., August 1939 issue, vol. 18, No. 12, pp. 361–364; 375) discusses the change in color of olive oil with advancing maturity and states in part: "There was a reduction of the pigments transmitting yellow and blue, while those transmitting red increased slightly. ... The color changes are so marked as to be readily observed in a roughly relative way even without reference to color standards. Compared in this way, the oil obtained early in the season appears distinctly greenish in color, while the later samples are predominantly golden. On the basis of the designation of Lovibond color glasses the extreme variations in yellow found were from 98.5 to 60, in red from 7.4 to 0.6, and in blue from 6.0 to 0.0."

In view of these color variations, which inherently occur in virgin olive oil, it will be clear that one of the most valuable contributions of my invention to the present art is the blending of colors through the use of olive juices.

My experiments show that flavors, odors and colors of olive and coconut appear to be water soluble and to be largely present in the liquid juice pressed from the seeds or nuts. The flavors, odors and colors may be further imparted particularly to certain olive oils themselves by a series of one or more exposures of the olive oil to the juice. The flavor, odor and color, as the case may be, is particularly returnable to refined olive oil by this process. These flavors, odors and colors may be imparted in a substantial manner to almost any oil so mixed with the respective juice. This is particularly true of bland processed edible oils above named.

My treatment conceives of mixing the desired oil or fat with either coconut or olive juice. A combination of coconut and olive juice may on occasions be acceptable. Generally, I mix equal parts of juice and oil. Sometimes I dilute the juice with water, the extent of dilution obviously depending upon the degree of change in character desired in the material to be treated. I find that in degree, the flavor, color and odor of olives are generally more effectively imparted to certain oils or fats than coconut which, though satisfactory, yields a less dominant flavor and odor. The green olive color is, of course, more obvious in oil treated with olive juice than color imparted from coconut juice.

I also may treat the oil to a series of mixing operations facilitated by use of several tanks. This operation involves decanting oil off the top of one tank of juice and oil, and pumping the oil into the bottom of another tank of juice. The mix may be agitated either mechanically or by bubble, colloid mill, live steam or other common methods of agitation. The desired flavor, odor and color in said juices can be extracted, also, by oils through the common process of liquid-liquid counter current extraction.

Likewise, I may separate the treated oil and juice by flotation and subsequent decanting, by centrifuging or other simple means. In final separation of treated oil and juice I find it sometimes advantageous to add calcium chloride, salt or other oil-insoluble compounds in order to effect a more complete and rapid breaking of the emulsion. It is sometimes desirable to heat the mixture of oil and juice to a temperature, preferably below the boiling point of water, i. e., a temperature of 70° F. to 210° F. for a period of from five to twenty minutes to effect a more complete flavoring of the oil. Thereafter, the juice and oil are separated by centrifuging or decantation. Preferably, I heat the mixture of oil or fat and juice to a temperature of 125° F. to 175° F. for a period of from five to twenty minutes. The juice employed may be either fresh or fermented, depending upon the properties desired to be imparted to the treated oil or fat.

Some people familiar with the olive oil industry feel that my treatment imparts to the oil certain anti-rancidity features. My personal experiments do not encourage any commercial value to this prospect. I recognize here these potential merits only as a general treatment of the known art.

The basic concept is to mix certain oils and fats with the juice of the best types of olives or coconuts, and thereafter separate the treated oil or fat, which will have absorbed apparently all of, or at least to a large extent, the true, natural fruit flavor, color and odor from such juices, with the result that the treated oil or fat will have had imparted thereto the natural flavor, aroma, and color of the best representative types of virgin olive or coconut oil. The following formulas exemplify many valued and practical uses of this process.

*Illustrative formulas*

1. 100 grams of refined cotton seed oil intimately mixed with 50 grams of olive juice; decant the oil; filter.

2. 100 grams of poorly flavored olive oil intimately mixed with four successive washes of 100 grams each of olive juice; final decanting and filtering.

3. 100 grams of solvent extracted and refined olive oils intimately mixed with four successive washes of 100 grams each of olive juice; final decanting and filtering.

4. 100 grams of solvent extracted and refined coconut oils intimately mixed with four successive washes of 100 grams each of coconut juice; final decanting and filtering.

5. 100 grams of specially high flavored olive oil for fish use intimately mixed with four successive washes of 100 grams each of olive juice; final decanting and filtering.

6. Treat 100 grams of California olive oil with 50 grams of imported olive juice.

7. 100 grams of refined fish oil and 100 grams each of olive juice for four successive washings wherein the tank is agitated ten minutes at each washing.

8. 100 grams selected high color juice of mild flavor and aroma mixed with 100 grams of olive oil which requires color fortification without enhanced flavoring, mixing, decanting, filtering. If trouble is experienced in de-emulsifying, add twenty grams of salt.

9. 100 grams of saponified deodorized coconut oil mixed with 100 grams of prepared coconut juice. Remove soap stock from liquid mass; allow to dry and form.

10. Take 100 grams of sesame oil hydrogenated to a 28° C. congealing point and deodorize. Add 200 grams of selected filtered olive juice. Warm mass to 150° F.; agitate in Waring blender for three minutes. Allow to settle. Pour in suitable centrifuge tubes. Spin five minutes at 5,000 R. P. M. Pour off supernatant liquid. Pour oil at a temperature slightly above its melting point on a metal surface; cool to 50° F. and subsequently mix to incorporate approximately 10% air, thus effecting plastisizing, resulting in olive flavored shortening.

11. Ferment 100 grams of olive juice by exposing in a warm room. After fermenting mix with 100 grams of refined corn oil. Separate the corn oil with Sharples centrifuge. Filter the oil.

12. Mix 100 grams of butterfat or margarine with 100 grams of coconut juice, said juice being a combination of equal quantities of the juice of the center of a coconut and the juice obtained by pressing the coconut. Centrifuge out the solids. If desired, dry further on a drum dryer.

13. Mix 100 grams of soap stock, such as a detergent of the character of sodium lauryl sulphate, with 100 grams of coconut juice. Separate this detergent from the juice through a centrifugal separator.

14. Mix 100 grams of the oil extracted from Queen type olives with 100 grams of juice extracted from Leccino type olives; decant and filter the oil.

A different, desirable and by many standards improved American olive oil may be produced by intimately mixing the oil with imported, selected Mediterranean juice. The juice may be fresh, pasteurized or otherwise preserved. As previously indicated, it is recognized that Mediterranean olives are different from, and frequently superior to, California olives or olive oil with respect to desirable qualities of flavor, color and odor. This difference is a result of the culture, climate and soil pertaining to Mediterranean groves, particularly those of Italy, Spain, France and Greece. The American growers favor irrigation—a Mediterranean rarity. Mediterranean growers have the labor to pick olives at maximum perfection of flavor and to select their olives most carefully. Atmosphere and moisture of the Mediterranean area creates a fine flavored olive.

European olives are grown primarily for oil and are frequently small, hardy varieties too costly or otherwise impractical to grow in the United States. I refer to such Spanish varieties as Arbequina, Sevillenca or Italian oil olives such as Leccino, Corregido or Morinello. I can take waters (juices) from these olives and alter or improve the oil of California varieties, as Queens and the oils from normal pickling olives.

These and other factors yield certain crops of olives whose flavor is desired and by some people thought lacking in most American oils. This flavor, I find, can be imparted to American oils by subjecting the oils to the selected Mediterranean juice, and the high nutritive value of the American oil is advantageously supplemented.

By use of the novel process described herein olive oils may be manufactured with improved uniform standards by subjecting the oils to one or more selected controlled olive juice or juices. For the first time it will be practical to more accurately establish and maintain uniform grades of olive and olive flavored oils.

Olive oils of insufficient flavor may be brought up to a more desirable standard of value and appearance by subjecting the oils to my process. I refer to choosing olive waters for their particular aroma or color and subjecting the low grade oils to these selected juices. Moreover, olive or coconut oils having undesirable characteristics may, as a part of my method, be refined and the free fatty acids and foreign flavors removed. The resulting bland oil may then be given an odor, color or flavor of the most highly acceptable character.

In removal by solvent extraction of olive oils from press cake the solvent imparts a flavor detrimental to the quality of the oil. Such oils usually have a high, free fatty acid content and are discolored. The solvent flavor and the fatty acids and discoloration may be removed as above suggested and the oil clarified and deodorized by customary methods of refining. Refining, however, produces a bland olive oil lacking in commercially desirable qualities of flavor, color and odor. These may be readily and effectively reimparted by subjecting the refined oil to treatment with selected olive juice and then separating the oil from the juice.

By treating the juice by dilution or boiling or by other simple means I can give an oil or fat treated thereby a greater or lesser flavor in relation to odor or color, or combinations thereof, and can use said juice to impart or partially alter the flavor, odor or color already present in an oil or fat.

I can produce a novel flavored oil by controlled fermenting of the juice prior to mixing it with the oil. In this respect I find a noticeable variance in the respective intensity of color, odor or flavor relative to each other among certain selected olive or coconut juices. By careful blending and selection I can treat oil to stress individually the factors of color, flavor or odor desired. Some olive juices impart outstanding color change without material alteration of odor or flavor of certain edible oils. Likewise, one can effect marked alterations in odor or flavor without essentially changing the color.

My process is particularly applicable in the treatment of refined oils prior to their incorporation in the manufacture of edible foods, such as olive flavor and odor in mayonnaise, salad oil and dressing, hydrogenized oils and fats, coconut oil and flavor designed for confections and bakery products.

Similarly, beneficial results in color, flavor and odor are possible in the treatment of certain soap stocks, including detergents, such as, sodium lauryl sulphate, sulphonated or sulphated oil, particularly after substantial refining and milling of the soap stock. With certain detergents the juice floats.

Coconut juice as a flavoring and odor-producing ingredient can be mixed with cream, whole milk or milk concentrates. The mass may then be centrifuged, preferably through a common Sharples continuous cream separator, removing the non-soluble, non-oleaginous substances which may have been added with the juice. If desired, the resultant fluid can ultimately be dried, for instance, with a spray dryer. Use of olive juice, however, has not been found acceptable in treatment of foods of the foregoing variety, apparently due to the presence of tannic acid in the olive juice.

The merits of the process herein described may be taken advantage of in preparation of mineral or animal oils destined for cosmetic use where certain characteristics of olive or coconut are desired.

One can attain valuable improvement in color, odor or flavor of oils or fats by the judicious use of olive juice and to a lesser extent coconut juice. The relationship of juices to oil may be as little as 10%. The percentage of juice mixed with oils may be raised to almost any amount. With selected juice, and particularly bland refined oil, even mixing of as little as 5% juice to 95% oil is effective.

The process is of special import in enhancing the olive flavor and odor of oils for addition to or incorporation with fish for canning. An olive oil or other glyceride oil can be treated by my process so that it more effectively dominates or blends and improves the flavor and aroma of the canned fish product. Similar treatment will make other oils and fats more desirable in flavor and aroma to incorporate with fish or with individual fish oils. Fish oils may also be mixed first with olive juice prior to canning with fish.

The result of the process herein disclosed and not heretofore known is the production of refined oils having olive characteristics with respect to flavor, odor and color imparted to them by olive juice or by the practice of an oleaginous process making possible the production of refined oils having corresponding coconut characteristics, said flavored oils containing no more than a trace of olive or coconut oil.

The invention having been herein described, what is claimed and sought to be secured by Letters Patent is:

1. The method of treating a fatty material to improve at least a selected one of its characteristics of flavor, color and odor, comprising the steps of: intimately mixing a fatty material with at least one substantially oil-free juice selected from the group consisting of olive juice and coconut juice; and effecting separation of the juice and treated fatty material.

2. A method as defined in claim 1, including the step of: fermenting the juice prior to mixing with the fatty material.

3. A method as defined in claim 1, including the steps of fermenting the juice prior to mixing with the fatty material, and heating the mixture to a temperature of substantially 70° F. to 210° F. for a period of from five to twenty minutes prior to separation of the juice and treated fatty material.

4. The method defined in claim 1, including the step of diluting the juice with water prior to mixing with the fatty material.

5. The method of treating a fatty material to impart a desirable flavor, odor, and color thereto, which comprises the steps of: treating a given volume of a fatty material with at least 5% by volume of at least one substantially oil-free juice selected from the group consisting of olive juice and coconut juice; and effecting separation of the juice and treated fatty material.

6. The method of treating fatty material to impart a desirable flavor, odor, and color thereto, which comprises the steps of: treating a given volume of a fatty material with a substantially equal volume of at least one oil-free juice selected from the group consisting of olive juice and coconut juice; and effecting separation of the juice from the treated fatty material.

7. The method of treating a refined glyceride oil to impart improved characteristics thereto, which comprises the steps of: subjecting a refined glyceride oil to treatment by the substantially oil-free juice of olives; and effecting separation of the olive juice from the treated glyceride oil.

8. The method of treating an olive oil to improve at least its color, which comprises the steps of: intimately mixing an olive oil with a substantially oil-free olive juice derived from olives yielding an oil of at least relatively superior color; and separating the olive juice from the mixture.

9. The method of treating an inferior coconut oil to enhance at least a selected one of its characteristics of odor, flavor and color, which comprises the steps of: intimately mixing coconut oil of inferior quality with a substantially oil-free coconut juice derived from coconuts yielding a relatively superior coconut oil; and separating the coconut juice from the mixture.

10. The method of treating a fatty material to impart at least a desired odor and color thereto, which comprises the steps of: intimately mixing a fatty material with a substantially oil-free mixture of olive and coconut juices; and separating the juice from the fatty material.

11. The method of treating an olive oil, comprising the steps of: treating an olive oil obtained from olives of one variety with the substantially oil-free olive juice obtained from olives of another variety; and separating said juice and treated olive oil.

12. A new product, comprising: a fatty material of an origin other than olive and coconut, and containing natural odor, flavor and color extracted by said fatty material from at least one substantially oil-free juice selected from the group consisting of olive juice and coconut juice.

13. A new product, comprising: a fatty material of an origin other than olive and coconut, and containing natural odor, flavor and color extracted by said fatty material from a mixture of substantially oil-free olive and coconut juices.

14. An olive oil, comprising: a refined olive oil initially deficient in at least one of its characteristics of odor, flavor and color, and containing natural material extracted by said refined oil from a substantially oil-free olive juice capable of enhancing at least the deficient characteristic.

15. An olive oil, comprising: a solvent-extracted, refined olive oil initially deficient in odor, flavor and color, and containing natural odor, flavor and color absorbed by said solvent-extracted, refined oil from a substantially oil-free olive juice.

16. An olive oil, comprising: an olive oil derived from one variety of olives and initially deficient in at least one of its characteristics of odor, flavor and color, and containing natural material extracted by said olive oil from a substantially oil-free olive juice derived from another variety of olives and capable of enhancing at least the deficient characteristic.

17. An improved coconut oil, comprising: a coconut oil initially deficient in at least one of its characteristics of odor, flavor and color, and containing natural material extracted by said coconut oil from a substantially oil-free coconut juice derived from relatively superior coconuts capable of enhancing at least the deficient characteristic.

18. An improved corn oil, comprising: a corn oil initially deficient in at least one of its characteristics of odor, flavor and color, and containing natural material extracted by said corn oil from a substantially oil-free olive juice capable of enhancing at least the deficient characteristic.

19. The method of treating an edible fatty material to improve at least a selected one of its characteristics of flavor, color and odor, comprising the steps of: intimately mixing an edible fatty material with at least one substantially oil-free juice selected from the group consisting of olive juice and coconut juice; and effecting separation of the juice from the treated edible fatty material.

20. A method as defined in claim 19 wherein the edible fatty material is olive oil.

21. A method as defined in claim 19 wherein the edible fatty material is coconut oil.

22. A method as defined in claim 19 wherein the edible fatty material is corn oil.

23. The method of imparting to an edible fatty material a given standard of quality with respect to at least a selected one of its characteristics of color, odor and taste, comprising the steps of: intimately mixing an edible fatty material with at least one substantially oil-free juice selected from the group consisting of olive juice and coconut juice, then separating the juice from the edible fatty material, and repeating the mixing and separating steps until said given standard is matched.

24. The method of treating a fatty material to improve at least a selected one of its characteristics of flavor, color and odor, comprising the steps of: subjecting a fatty material to treatment by at least one substantially oil-free juice selected from the group consisting of olive juice and coconut juice in the presence of heat between temperatures of substantially 70° F. and 210° F. for a period of from five to twenty minutes, and then separating the juice from the treated fatty material.

25. The method of treating a fatty material to improve at least a selected one of its characteristics of flavor, color and odor, comprising the steps of: intimately mixing a fatty material with at least one substantially oil-free juice selected from the group consisting of olive juice and coconut juice in the presence of heat between temperatures of substantially 120° F. to 175° F. for a period of from five to twenty minutes, and then separating the juice from the treated fatty material.

26. The method of improving an inferior olive oil by accentuating at least one of its characteristics of color, odor and taste, comprising the steps of: crushing olive seeds of superior flavor, color and odor characteristics, selectively extracting therefrom the olive oil and olive juice, mixing the olive juice with an inferior olive oil, and then separating the olive juice from the mixture.

27. The method of improving an inferior coconut oil by accentuating at least one of its characteristics of flavor, color and odor, comprising the steps of: crushing the meat of coconuts of superior flavor, color and odor characteristics, selectively extracting therefrom the coconut oil and coconut juice, mixing the coconut juice with an inferior coconut oil, and then separating the coconut juice from the mixture.

28. A new product, comprising: a fatty material containing natural odor, flavor and color, absorbed by said fatty material from at least one substantially oil-free juice selected from the group consisting of olive juice and coconut juice.

29. A new product, comprising: a fatty material containing natural odor, flavor and color, absorbed by said fatty material from a mixture of substantially oil-free olive and coconut juices.

30. A new product, comprising: a refined glyceride oil containing natural odor, flavor and color extracted by said refined glyceride oil from at least one substantially oil-free juice selected from the group consisting of olive juice and coconut juice.

JOHN HOOD FORKNER.